United States Patent
Nojiri

(10) Patent No.: US 9,597,949 B2
(45) Date of Patent: Mar. 21, 2017

(54) GLASS RUN FOR AUTOMOBILE

(71) Applicant: TOYODA GOSEI CO., LTD., Kiyosu-shi, Aichi-ken (JP)

(72) Inventor: Masatoshi Nojiri, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 5 days.

(21) Appl. No.: 14/918,931

(22) Filed: Oct. 21, 2015

(65) Prior Publication Data
US 2016/0129767 A1 May 12, 2016

(30) Foreign Application Priority Data

Oct. 28, 2014 (JP) ................................. 2014-219191

(51) Int. Cl.
*B60J 10/76* (2016.01)

(52) U.S. Cl.
CPC ..................................... *B60J 10/76* (2016.02)

(58) Field of Classification Search
CPC . B60J 5/0402; B60J 10/45; B60J 10/40; B60J 1/17; E06B 7/16
USPC ........................................ 49/440, 441, 495.1
See application file for complete search history.

(56) References Cited

U.S. PATENT DOCUMENTS

| | | | |
|---|---|---|---|
| 2,817,558 A * | 12/1957 | Kubacka et al. | 49/495.1 |
| 4,945,681 A * | 8/1990 | Nozaki et al. | 49/495.1 |
| 5,014,464 A * | 5/1991 | Dupuy et al. | 49/440 |
| 5,199,761 A * | 4/1993 | Dannecker et al. | 296/146.16 |
| 5,548,929 A * | 8/1996 | Larsen et al. | 49/441 |
| 5,702,148 A * | 12/1997 | Vaughan et al. | 296/146.9 |
| 5,732,509 A * | 3/1998 | Buehler et al. | 49/440 |
| 6,205,712 B1 * | 3/2001 | Ellis | 49/441 |
| 6,370,824 B1 * | 4/2002 | Keeney et al. | 49/441 |
| 7,383,662 B2 * | 6/2008 | Tamaoki | 49/441 |
| 7,487,615 B2 * | 2/2009 | Watanabe et al. | 49/441 |
| 8,522,481 B2 * | 9/2013 | Brancaleone et al. | 49/440 |
| 8,595,982 B2 * | 12/2013 | Matsuura et al. | 49/441 |
| 8,782,954 B2 * | 7/2014 | Kawai et al. | 49/475.1 |
| 8,898,958 B2 * | 12/2014 | Filipczak et al. | 49/502 |
| 9,033,394 B2 * | 5/2015 | Heirtzler et al. | 296/146.2 |
| 9,114,693 B2 * | 8/2015 | Prater et al. | |
| 2005/0229496 A1 * | 10/2005 | Tashima et al. | 49/441 |
| 2006/0021282 A1 * | 2/2006 | Tamaoki et al. | 49/441 |

(Continued)

FOREIGN PATENT DOCUMENTS

| JP | 2006-056472 A | 3/2006 |
|---|---|---|
| JP | 2006-341693 A | 12/2006 |

*Primary Examiner* — Jerry Redman
(74) *Attorney, Agent, or Firm* — Posz Law Group, PLC

(57) ABSTRACT

A glass run that is excellent in appearance quality and durability, and exhibits improved sealing properties is proposed. The glass run for attachment to vertical sides of the door frame has a bottom wall for attachment to a door frame or a door molding, and an outer seal lip extending from an exterior side edge of the bottom wall. The outer seal lip has a base part extending towards a door glass, and a main part extending from the base part while curving inwardly of the base part. When the outer seal lip is deformed and bent with a side edge of the door glass, a tip end part of the outer seal lip is located inwardly of a surface of the bottom wall or the outer side wall, which faces a side edge of the door glass, and the base part is formed to have a rigidity lower than that of the main part.

6 Claims, 4 Drawing Sheets

(56) References Cited

U.S. PATENT DOCUMENTS

2006/0037249 A1     2/2006   Kawamura
2012/0234621 A1*   9/2012   Syvret et al. ................. 180/281
2012/0274102 A1*   11/2012   Ertl .............................. 296/201

* cited by examiner

GLASS RUN FOR AUTOMOBILE

CROSS-REFERENCE TO RELATED APPLICATION

This application is related to and claims priority from Japanese patent Application No. 2014-219191 incorporated herein by reference.

BACKGROUND OF THE INVENTION

1. Field of the Invention

The present invention relates to a glass run adapted to be attached to an inner periphery of a door frame of an automobile door for guiding a door glass as it is raised and lowered.

2. Description of Related Art

As shown in FIG. 1, a glass run 10 is attached to an inner periphery of a door frame 12 of an automobile door 14 for guiding a door glass 16 as it is raised and lowered. An entire part of the conventional glass run 10 is shown in FIG. 2, and the cross-section of the conventional glass run 10 attached to straight parts 10a of the door frame 12 is shown in FIG. 3 and FIG. 4.

As shown in FIG. 1, conventionally, the glass run 10 is attached within a channel of the door frame 12 to guide the door glass 16 as it is raised and lowered, and provide a seal between the door glass 16 and the door frame 12. In addition, as shown in FIG. 2, the conventional glass run 10 includes an upper side part 10c for attachment to an upper side of the door frame 12, a rear vertical side part 10d for attachment to a rear vertical side of the door frame 12, a front vertical side part 10e for attachment to a front vertical side of the door frame 12 and corner parts 10b for connecting the upper side part 10c to the rear vertical side part 10d or the front vertical side part 10e.

The upper side part 10c, the rear vertical side part 10d and the front vertical side part 10e define straight parts 10a formed by extrusion.

And in order to minimize a level difference between an exterior surface of the door glass 16 and an exteriori surface of the door frame 12, the exterior surface of the door glass 16 has been made approximately flush with the exterior surface of the door frame 12. As shown in FIG. 3, in a conventional flush type glass run 10 thus arranged, a side edge 18 of the door glass 16 contacts an outer seal lip 20 to provide a seal between the door glass 16 and the door frame 12. A slider 22 attached to the door glass 16 slides an interior space of the glass run 10 to guide the door glass 16.

In this case, when the door glass 16 is raised and lowered along the vertical sides of the door frame 12 with the side edge 18 of the door glass 16 contacting the outer seal lip 20, as shown by dotted lines in FIG. 3, the outer seal lip 20 reverses to project outwardly of an automobile body, thereby degrading the appearance around the outer seal lip 20.

In addition, a stress may be concentrated on a base part 24 of the outer seal lip 20 to deteriorate the durability of the glass run 10, and consequently, cracks may be generated in the outer seal lip 20.

Under such circumstance, as shown in FIG. 4, in order to improve both the durability and the sealing properties of the outer seal lip 20, another conventional glass run 30 is arranged to have an outer seal lip 32 and an outer cover lip 34, each extending from an outer side wall 36. And a first inner seal lip 38 and a second inner seal lip 40, each extending from an inner side wall 42, are provided to seal the slider 22 attached to the door glass 16 (see Japanese patent application laid-open No, 2006-56472, for example.)

In this case, four seal Ups are provided for sealing so that, in order to adequately bring the slider 6 attached to the door glass 16 into contact with the four seal lips, the glass run 30 has been required to be assembled with high precision, and the outer cover lip 34 for covering the door glass 16 becomes long, thereby degrading the appearance quality therearound.

SUMMARY OF THE INVENTION

It is an object of the present invention to provide a glass run that is excellent in appearance quality and durability, and exhibits improved sealing properties.

In order to achieve the above-described object, according to a first aspect of the present invention, in a glass run for an automobile, which is adapted to be attached to an inner periphery of a door frame of a door of an automobile for guiding a door glass as it is raised and lowered, the glass run for attachment to vertical sides of the door frame includes a bottom wall for attachment to the door frame or a door molding, and an outer seal lip extending from an exterior side edge of the bottom wall or a tip end of an outer side wall. The outer seal lip includes a base part extending towards the door glass, and a main part extending from the base part while curving inwardly therefrom. When the outer seal lip is deformed and bent with a side edge of the door glass, a tip end part of the outer seal lip is located inwardly of a surface of the bottom wall or the outer side wall, which faces the side edge of the door glass.

With the arrangement of the first aspect of the present invention, in a glass run for an automobile, which is adapted to be attached to an inner periphery of a door frame of a door of an automobile and guide a door glass as it is raised and lowered, the glass run for attachment to vertical sides of the door frame includes a bottom wall for attachment to the door frame or a door molding, and an outer seal lip extending from an exterior side edge of the bottom wall or a tip end of an outer side wall. Therefore, the bottom wall or the outer side wall is attached to the door frame or the door molding to hold the glass run, and the outer seal lip is made to contact the side edge of the door glass to seal the same.

The outer seal lip includes a base part extending towards the door glass, and a main part extending from the base part while curving inwardly therefrom. Therefore, the main part is supported with the base part, and the main part of the outer seal lip is made to contact the side edge of the door glass, whereby a gap between the door glass and the outer seal lip can be sealed.

When the outer seal lip is deformed and bent with the side edge of the door glass, the tip end part of the outer seal lip is located inwardly of a surface of the bottom wall or the outer side wall, which faces the side edge of the door glass. Therefore, the side edge of the door glass can be securely made to contact the main part of the outer seal lip so that the sealing properties between the side edge of the door glass and the main part of the outer seal lip can be improved.

According to a second aspect of the present invention, the base part of the outer seal lip is located in a space defined between a surface of the bottom wall or the outer side wall, from which the base part is extended, and a position in which the side edge of the door glass most approaches the bottom wall or the outer side wall, and the base part of the outer seal lip exhibits a rigidity lower than that of the main part.

With the arrangement of the second aspect of the present invention, the base part of the outer seal lip is formed so as to be located in the space defined between the surface of the bottom wall or the outer side wall, from which the base part is extended, and the position in which the side edge of the door glass most approaches the bottom wall or the outer side wall. Therefore, the base part of the outer seal lip is ensured to have a predetermined length to prevent the concentration of stress when the base part is deformed, whereby the deformation of the outer seal lip is restrained when the side edge of the door glass contacts the main part of the outer seal lip so that the reversing of the outer seal lip is restrained to prevent degradation of the appearance quality.

Since the base part is formed to have a rigidity lower than that of the main part, when the side edge of the door glass contacts the main part of the outer seal lip, an entire portion of the base part becomes flexible so that the abnormal deformation of the outer seal lip, and the generation of cracks therein can be prevented without any concentration of stress on specific areas of the base part.

According to a third aspect of the present invention, the main part of the outer seal lip is formed such that a curvature of the tip end part is smaller than that of the base part.

With the arrangement of the third aspect of the present invention, the main part of the outer seal lip is formed such that a curvature of the tip end part is smaller than that of the base part. As a result, when the side edge of the door glass contacts the main part of the outer seal lip, the position of the tip end part can be adjusted frontwardly and rearwardly, and the base part becomes flexible. When the tip end part contacts the bottom wall, the outer seal lip contacts the bottom wall in an inclined condition, and slides on the bottom wall without stretching thereon. Therefore, when the door glass is raised and lowered, the reversing and turning-over of the outer seal lip can be prevented.

According to a fourth aspect of the present invention, the base part of the outer seal lip is formed to have a thickness less than that of the main part.

With the arrangement of the fourth aspect of the present invention, the base part of the outer seal lip is formed to have a thickness less than that of the main part so that when the side edge of the door glass contacts the main part of the outer seal lip, the base part becomes flexible, and consequently, the main part securely contacts the side edge of the door glass to prevent the abnormal deformation of the outer seal lip, and the generation of cracks therein.

According to a fifth aspect of the present invention, a low friction sliding layer is formed on a surface of the main part of the outer seal lip, which contacts the door glass, and another low friction sliding layer is formed on the base part so as to have a thickness less than that of the main part, or no low friction sliding layer is formed thereon.

With the arrangement of the fifth aspect of the present invention, a low friction sliding layer is formed on a surface of the main part of the outer seal lip, which contacts the door glass, and another low friction sliding layer is formed on the base part so as to have a thickness less than that of the main part, or no low friction sliding layer is formed thereon. Since the low friction sliding layer exhibiting a higher rigidity is formed on the base part so as to have a thickness less than that of the main part, or no low friction sliding layer is formed thereon, when the side edge of the door glass contacts the main part of the outer seal lip, the base part becomes flexible securely so that the main part securely contacts the side edge of the door glass to prevent the abnormal deformation of the outer seal lip, and the generation of cracks therein. In addition, the side edge of the door glass readily slides on the main part of the outer seal lip to enable the smooth raising and lowering of the door glass.

According to a sixth aspect of the present invention, the bottom wall for contacting the tip end part of the outer seal lip is formed to have an inclined surface.

With the arrangement of the sixth aspect of the present invention, the bottom wall for contacting the tip end part of the outer seal lip is formed to have an inclined surface so that when the side edge of the door glass contacts the main part of the outer seal lip, the tip end part of the outer seal lip contacts the bottom wall and smoothly slides on the inclined surface of the bottom wall, thereby lowering a friction force between the side edge of the door glass and the main part of the outer seal lip to enable the smooth lowering and raising of the door glass. By providing the tip end part of the outer seal lip away from the door glass, as compared with the base part of the outer seal lip, the reversing of the outer seal lip can be prevented.

According to a seventh aspect of the present invention, the glass run includes the outer seal lip, the bottom wall and an inner side wall which are integrally formed with each other, and an inner seal lip is extended from the inner side wall towards the outer seal lip.

With the arrangement of the seventh aspect of the present invention, the glass run includes the outer seal lip, the bottom wall and an inner side wall which are integrally formed with each other, and an inner seal lip is extended from the inner side wall towards the outer seal lip. As a result, the outer seal lip, the bottom wall and the inner side wall, which define a generally U-shaped cross-section, hold a slider of the door glass to guide the raising and lowering of the door glass, and seal the door glass and the slider by means of the outer seal lip and the inner seal lip.

According to an eighth aspect of the present invention, the glass run includes the outer seal lip, and the bottom wall or the outer side wall, which are integrally formed with each other, whereas the inner side wall and the inner seal lip extended from the inner side wall towards the outer seal lip are formed separately from the outer seal lip, and the bottom wall or the outer side wall.

With the arrangement of the eighth aspect of the present invention, since the glass run includes the outer seal lip, and the bottom wall or the outer side wall, which are integrally formed with each other, the bottom wall or the outer side wall is attached to the door frame or the door molding to seal the side edge of the door glass by means of the outer seal lip.

The inner side wall and the inner seal lip extended from the inner side wall towards the outer seal lip are formed separately from the outer seal lip, and the bottom wall or the outer side wall so that the inner seal Up contacts the slider to seal the same. In addition, the inner side wall and the inner seal lip can be formed by extrusion separately from the outer seal lip and the bottom wall or the outer side wall, whereby the inner side wall and the inner seal lip, each having a complicated shape, can be readily formed.

Since the base part of the outer seal lip is formed so as to have a distance identical to a distance between a surface of the bottom wall or the outer side wall, from which the base part is extended, and a position in which the side edge of the door glass most approaches the bottom wall, the base part of the outer seal lip can be maintained to have a predetermined length, thereby restraining the abnormal deformation of the outer seal lip when the side edge of the door glass contacts the main part of the outer seal lip to restrain the reversing of the outer seal lip, and as a result, the degrading of the appearance can be prevented.

Since the base part is formed to exhibit a rigidity lower than that of the main part, when the side edge of the door glass contacts the main part of the outer seal lip, the entire portion of the base part becomes flexible so that the abnormal deformation of the outer seal lip and the generation of cracks therein can be prevented without any stress concentration on a specific area of the base part.

Other objects, features, and characteristics of the present invention will become apparent upon the consideration of the following description and the appended claims with reference to the accompanying drawings, all of which form a part of this specification.

DETAILED DESCRIPTION OF THE PREFERRED EMBODIMENTS

Embodiments of the present invention will be explained with reference to FIG. 1, FIG. 2 and FIG. 5 through FIG. 8.

Figure 1:
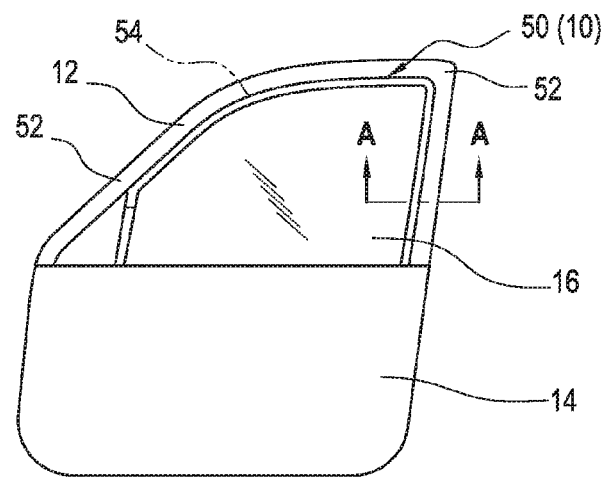
FIG. 1 is a front view of an automobile door.
Figure 2:
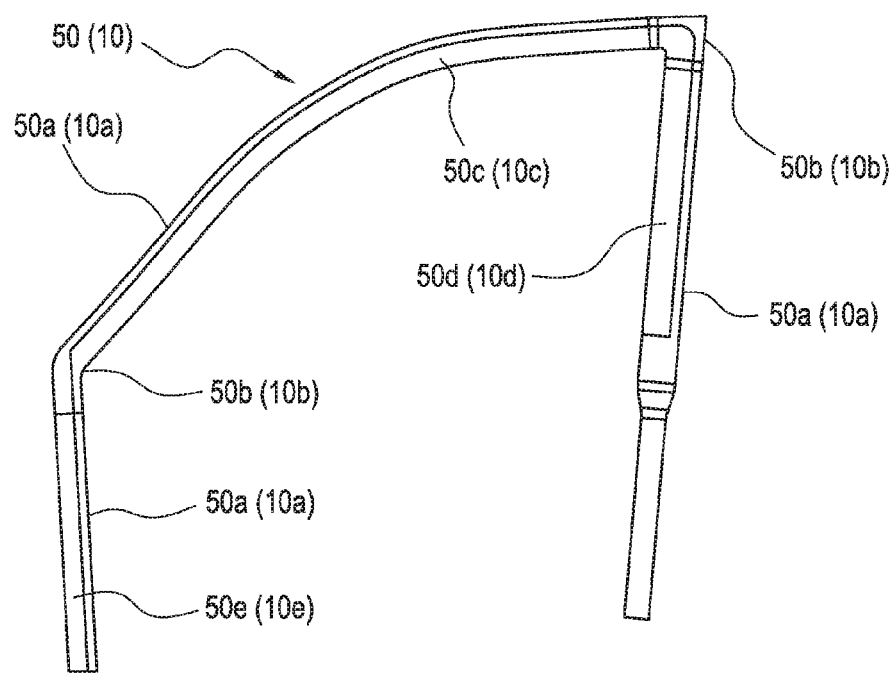
FIG. 2 is a front view of a glass run in embodiments of the present invention.
Figure 3:
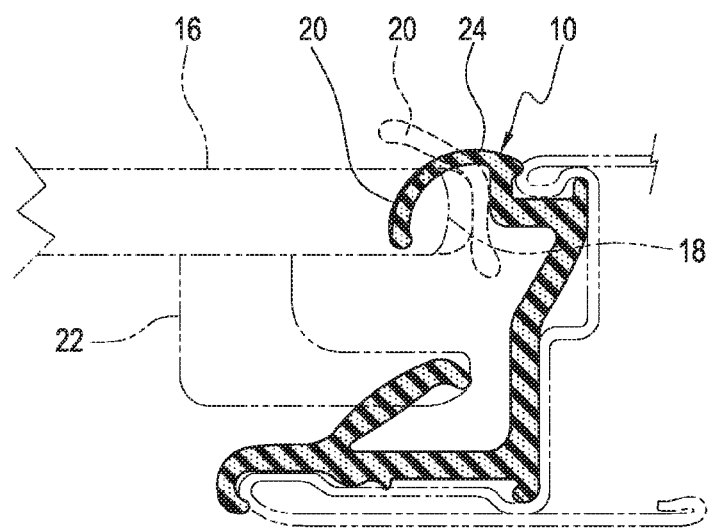
FIG. 3 is a cross-sectional view of a conventional glass run attached to an upper side of a door frame.
Figure 4:
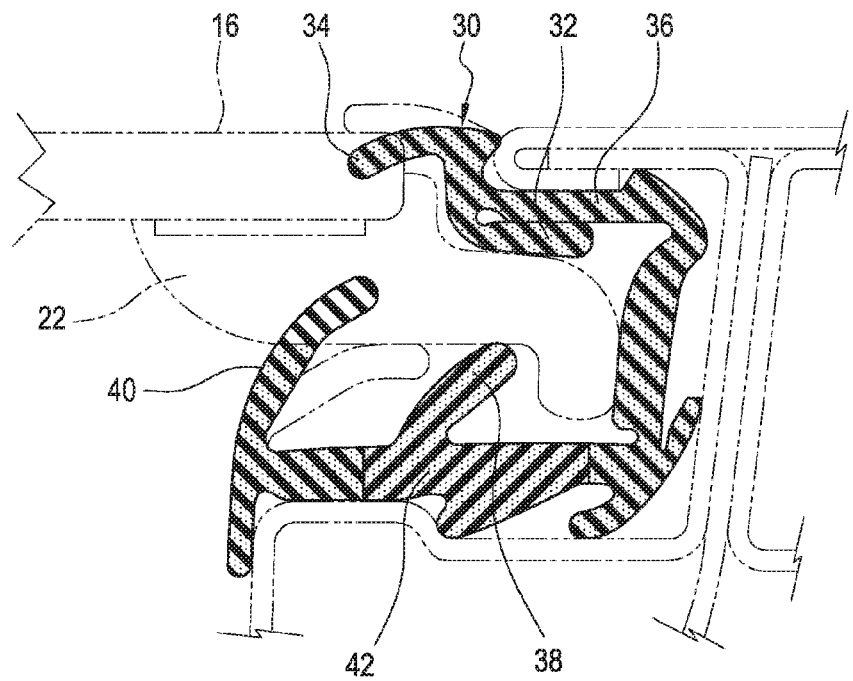
FIG. 4 a cross-sectional view of another conventional glass run attached to an upper side of a door frame.

FIG. 1 is a front view of a front door 14 of an automobile. FIG. 2 is a front view of a glass run 50 for a front door, which is attached to a door frame 12 of the door 14. As shown in FIG. 1, the door frame 12 is provided in an upper part of the door 14, and a door glass 16 is attached thereto so as to be raised and lowered therealong. The glass run 50 is attached to an inner periphery of the door frame 12 to guide the door glass 16 as it is raised and lowered, and provide a seal between the door glass 16 and the door frame 12.

As shown in FIG. 2, an entire portion of the glass run 50 is formed of a thermoplastic elastomer, and includes straight parts 50a, each being formed by extrusion, and corner parts 50b, each being attached to corner parts 52 of the door frame 12, connecting the straight parts 50a to each other, and being formed by molding.

The straight parts 50a include an upper side part 50c for attachment to an upper side of the door frame 12, a rear vertical side part 50d for attachment to a rear vertical side of the door frame 12 and a front vertical side part 50e for attachment to a division sash defining a front vertical side of the door frame 12.

In order to form these extruded parts in conformity with the configuration of the door frame 12, corner parts 50b are formed at front and rear corners by molding to connect the straight parts 50a to each other. The corner parts 50b of the glass run 50 are attached to the corners 52 of the door frame 12.

First, a first embodiment of the present invention will be explained with reference to FIG. 5, and next, second through fourth embodiments of the glass run will be explained with reference to FIG. 6 through FIG. 8.

In the first embodiment, the glass run 50 is attached to a tip end part of a door molding 54 to be attached to the door frame 12. First, the configuration of the tip end part of the door molding 54 will be explained, and then, the configuration of the glass run 50 will be explained.

The tip end part of the door molding 54 has a curving tip end 56 having a hook-shaped configuration, which projects from an interior surface of the door molding 54, and a later-described bottom holding lip 58 of the glass run 50 is engaged with the curving tip end 56.

A holding part 60 is extended from the tip end part of the door molding 54 slightly away from the curving tip end 56 so as to project inwardly of the automobile body. The holding part 60 of the door molding 54 holds a later-described bottom wall 62 of the glass run 50.

An engaging part 64 is extended perpendicularly from the holding part 60 of the door molding 54. The engaging part 64 of the door molding 54 is engaged with a tip end part 66 of a later-described inner side wall 68, thereby holding the glass run 50.

Figure 5:
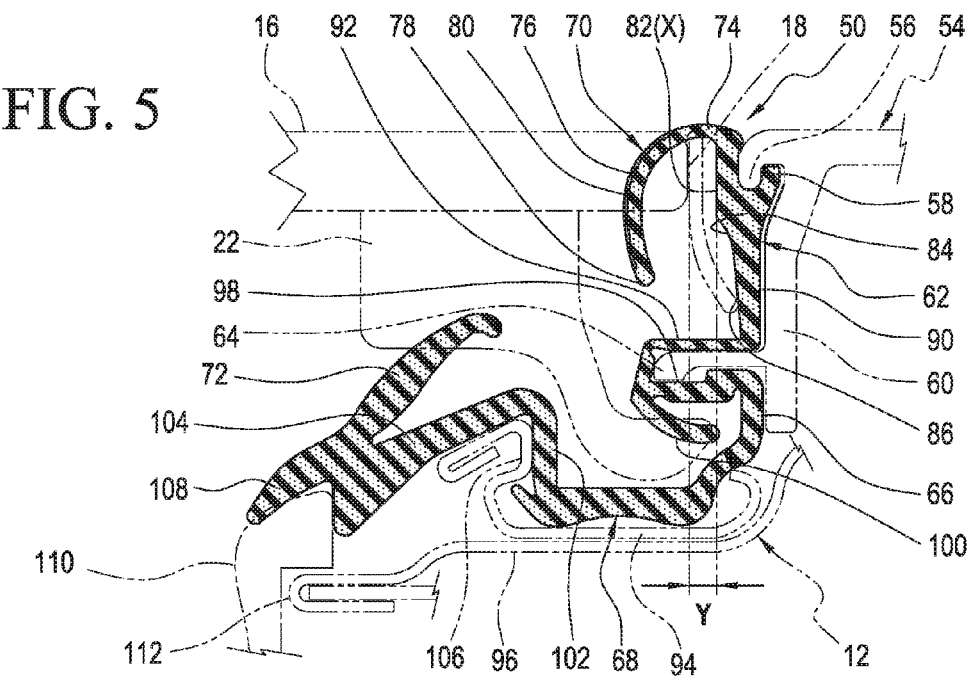
FIG. 5 is a cross-sectional view of a glass run in a first embodiment of the present invention, which is taken long line A-A of FIG. 1.

As shown in FIG. 5, the sectional shape of the glass run 50 in the first embodiment, which is to be attached to the vertical side of the door frame 12, includes an outer seal lip 70, the bottom wall 62 and the inner side wall 68, which are integrally formed together.

The door glass 16 slides such that the side edge 18 thereof is capable of contacting the outer seal lip 70, and a slider 22 is attached to an interior surface of the side edge 18 of the door glass 16.

An inner seal lip 72 is extended from the inner side wall 68 toward the outer seal lip 70. As a result, the outer seal lip 70, the bottom wall 62 and the inner side wall 68, which define a generally U-shaped cross-section, hold the slider 22 of the door glass 16, thereby sealing the door glass 16 and the slider 22 by means of the outer seal lip 70 and the inner seal lip 72.

The outer seal lip 70 includes a base part 74 which is extended from a side edge of the bottom wall 62 while curving slightly or projecting approximately straight toward the door glass 16, a main part 76 which curves inwardly from the base part 74, and a tip end part 78 which is formed in a tip end of the main part 76 so as to be capable of contacting the bottom wall 62. As a result, by bringing the main part 76 of the outer seal lip 70 into contact with the side edge 18 of the door glass 16, a seal therebetween is effected, and by bringing the tip end part 78 of the outer seal lip 70 into contact with the bottom wall 62, the main part 76 is supported, whereby the sealing properties between the side edge 18 of the door glass 16 and the main part 76 of the outer seal lip 70 can be improved.

The base part 74 of the outer seal lip 70 is formed to have a distance identical to a distance (distance designated as Y in FIG. 5) between a bottom wall reference plane 82 that is a plane from which the base part 74 is extended from the bottom wall 62 (plane designated as X in FIG. 5) and a position in which the side edge 18 of the door glass 16 most approaches the bottom wall 62. Therefore, the base part 74 of the outer seal lip 70 can be ensured to have a predetermined length so that a stress concentration is prevented during the deformation of the base part 74, whereby the deformation of the base part 74 of the outer seal lip 70 when contacting the side edge 18 of the door glass 16 is restrained, and accordingly, the reversing of the outer seal lip 70 to project outwardly is restrained to prevent the degrading of the appearance therearound.

The base part 74 of the outer seal lip 70 is formed so as to exhibit a rigidity lower than that of the main part 76. Therefore, when the side edge 18 of the door glass 16 contacts the main part 76 of the outer seal lip 70, the entire portion of the base part 74 becomes flexible, stress is not concentrated on a specific area of the base part 74, whereby the outer seal lip 70 can be prevented from abnormally deforming and generating cracks.

It is preferable that the main part 76 of the outer seal lip 70 is arranged such that a curvature of the tip end part 78 is less than that of the main part 76. In this case, when the side edge 18 of the door glass 16 contacts the main part 76 of the outer seal lip 70, the position of the tip end part 78 can be adjusted frontwardly and rearwardly. Since the curvature of the base part 74 is greater, the base part 74 readily flexes, and since the curvature of the tip end part 78 is smaller, it contacts the side edge 18 of the door glass 16 over a wide area, thereby improving the sealing properties.

The base part 74 of the outer seal lip 70 is formed thinner than the main part 76. In this case, when the side edge 18 of the door glass 16 contacts the main part 76 of the outer seal lip 70, the base part 74 exhibits a lower rigidity so as to be readily flexed, whereby the main part 76 securely contacts the side edge 18 of the door glass 16, and consequently, the outer seal lip 70 can be prevented from abnormally deforming and generating cracks.

The main part 76 of the outer seal lip 70 may have a low friction sliding layer 80 on an outer surface for contacting the door glass 16. The low friction sliding layer 80 can be formed by applying a material exhibiting a small sliding resistance such as a thermoplastic elastomer containing a high ratio of an olefin part, a silicone resin or a urethane resin.

The base part 74 of the outer seal lip 70 has the low friction sliding layer 80 having a thickness less than that of the main part 76, or has no low friction sliding layer. In this case, when the side edge 18 of the door glass 16 contacts the main part 76 of the outer seal lip 70, the low friction sliding layer 80 of the base part 74 exhibits a greater rigidity so that the base part 74 having the thinner low friction sliding layer 80 or no low friction sliding layer exhibits a lower rigidity, as compared with that of the main part 76, and consequently becomes more flexible, whereas the main part 76 is difficult to flex so as to securely contact the side edge 18 of the door glass 16, and consequently, the outer seal lip 70 can be prevented from abnormally deforming and generating cracks. In addition, the side edge 18 of the door glass 16 readily slides on the low friction sliding layer 80 of the main part 76 of the outer seal lip 70 so that the door glass 16 can be smoothly raised and lowered.

The bottom wall 62 for contacting the tip end part 78 of the outer seal lip 70 has a first inclined surface 84 and a second inclined surface 86. As a result, when the side edge 18 of the door glass 16 contacts the main part 76 of the outer seal lip 70, the tip end part 78 of the outer seal lip 70 contacts the first inclined surface 84 and the second inclined surface 86 of the bottom wall 62 so that the tip end part 78 can smoothly slide on the first inclined surface 84 and the second inclined surface 86.

By virtue of the first inclined surface 84 and the second inclined surface 86, a reaction force and a friction force between the side edge 18 of the door glass 16 and the main part 76 of the outer seal lip 70 can be lowered so that the door glass 16 can be smoothly raised and lowered. When the outer seal lip 70 is long, the tip end part 78 of the outer seal lip 70 can directly contact and slide on the second inclined surface 86 without contacting the first inclined surface 84 of the bottom wall 62.

The configuration of the bottom wall 62 is arranged such that, as described above, the outer seal lip 70 is extended from a surface of an exterior side edge of the bottom wall 62, which faces the door glass 16, and the surface of the exterior side edge of the bottom wall 62, which faces the door glass 16, is formed flat by a predetermined small width as the bottom wall reference plane 82. The first inclined surface 84 is formed continuously with the bottom wall reference plane 82, and the second inclined surface 86 is formed continuously with the first inclined surface 84. The first inclined surface 84 is formed so as to have an inclination angle greater than that of the second inclined surface 86.

Furthermore, where a low friction sliding member is respectively provided on the first inclined surface 84 and the second inclined surface 86, the tip end part 78 of the outer seal lip 70 can slide more readily.

The second inclined surface 86 is supported with a panel bottom part 88 of the door frame 12.

The bottom holding lip 58 is formed in a surface of the bottom wall 62, which faces the door molding 54. The bottom holding lip 58 is engaged with the curving tip end 56 of the door molding 54 to hold the bottom wall 62. Furthermore, a surface of the bottom wall 62, which faces a panel, is bonded to the holding part 60 of the door molding 54 with a double-sided adhesive tape 90. As a result, a seal is provided between the door molding 54 and the bottom wall 62. A bottom wall joint 92 is extended from a tip end of the bottom wall 62 toward the door glass 16 in a direction perpendicular to the tip end of the bottom wall 62, and is connected to the tip end part 66 of the inner side wall 68.

The inner side wall 68 is formed into a plate shape continuously with the bottom wall joint 92 of the bottom wall 62.

A main part of the inner side wall 68 is attached within a channel 94 of a door inner panel 96 of the door frame 12. Side edges of the channel 94 are respectively formed so as to curve into a hook-like configuration to hold a main part of the inner side wall 68.

The tip end part 66 is extended from a tip end of the inner side wall 68, which faces the bottom wall 62, and is connected to the bottom wall joint 92. The engaging part 64 of the door molding 54 is inserted between the bottom wall joint 92 and the tip end part 66 of the inner side wall 68 and engaged with a recess 98 formed in a surface of the tip end part 66 of the inner side wall 68, which faces the bottom wall joint 92.

An inner sub-seal lip 100 is extended from a tip end of the tip end part 66 of the inner side wall 68 so as to face an interior surface of the inner side wall 68. The inner sub-seal lip 100 contacts and seals a tip end part of the slider 22 attached to the door glass 16, and guides the tip end part of the slider 22 along with the inner side wall 68.

An extension part 102 is extended from a side edge of the inner side wall 68, which is opposite to the bottom wall 62, and a holding lip 104 is formed in the extension part 102. The extension part 102 is formed so as to be bent, and a channel engaging part 106 contacts a bent part of the extension part 102 to hold the inner side wall 68.

The inner seal lip 72 and an inner cover lip 108 are formed along a tip end of the holding lip 104.

The inner seal lip 72 contacts a base part of the slider 22 to provide a seal between the slider 22 and the door frame 12. The inner cover lip 108 contacts a tip end of a garnish 110 attached to the door frame 12 to cover a boundary area between the door frame 12 and the garnish 110, and hold the tip end of the garnish 110, thereby holding the holding lip 104. The garnish 110 covers a tip end part 112 of the door inner panel 96.

Next, a second embodiment of the present invention will be explained with reference to FIG. 6. The second embodiment differs from the first embodiment in that an inner side wall 114, and an inner seal lip 116 extending from the inner side wall 114 towards an outer seal lip 118 are formed separately from the outer seal lip 118 and a bottom wall 120, whereas remaining parts are substantially similar to those of the first embodiment, and accordingly, only different parts will be explained while omitting explanations of the similar parts.

The configuration of the outer seal lip 118 is similar to that of the first embodiment. The configuration of the bottom wall 120 is similar to that of the first embodiment in the bottom wall reference plane 82, the first inclined surface 84 and the second inclined surface 86, and a reverse surface of the bottom wall 120 is formed flat, and is bonded to the door molding 54 with the double-sided adhesive tape 90. The holding lip 58 is engaged with the tip end part 56 of the door molding 54.

Figure 6:
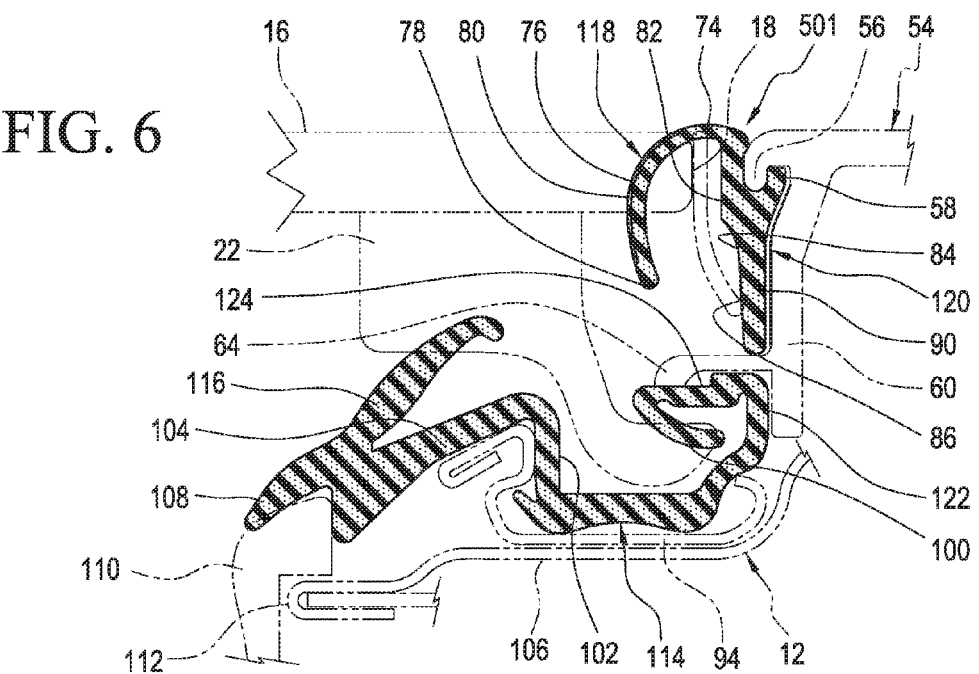
FIG. 6 is a cross-sectional view of a glass run in a second embodiment of the present invention, which is taken along line A-A of FIG. 1.

As shown in FIG. 6, no bottom wall joint is extended from a tip end of the bottom wall 120, and the bottom wall 120 is separated from a tip end part 122 of the inner side wall 114.

The engaging part 64 of the door molding 54 is engaged with a recess 124 formed in a surface facing the engaging part 64 of the door molding 54.

A third embodiment of the present invention will be explained with reference to FIG. 7. The third embodiment differs from the first embodiment in that an outer side wall 126 extends from a bottom wall 128, and an outer seal lip 130 extends from the outer side wall 126, and in the configuration of the bottom wall 128, whereas remaining parts are substantially similar to those of the first embodiment, and accordingly, only different parts will be explained while omitting explanations of the similar parts.

In the third embodiment, the outer side wall 126 is formed into a plate shape continuously with the bottom wall 128, and an outer side wall reference plane 132 is formed so as to extend outwardly from a tip end of the outer side wall 126 while bending outwardly. The outer seal lip 130 is formed from a tip end of the outer side wall reference plane 132. The configuration of the outer seal lip 130, and has a base part 74 inclusive of a main part 76, a tip end part 78 and a low friction sliding layer 80 is similar to that of the first embodiment.

The outer side wall reference plane 132 has a similar function to that of the bottom wall reference plane 82 in the first embodiment. Namely, the base part 74 of the outer seal lip 130 is formed to have a distance identical to a distance (distance designated as Y in FIG. 7) between the outer side wall reference plane 132 that is a plane from which the base part 74 is extended from the bottom wall 128 (plane designated as X in FIG. 7) and the position in which the side edge 18 of the door glass 16 most approaches the outer side wall 126. Therefore, the base part 74 of the outer seal lip 130 can be ensured to have a predetermined length so that a stress concentration is prevented during the deformation of the base part 74, whereby the deformation of the main part 76 of the outer seal lip 130 is restrained when contacting the side edge 18 of the door glass 16, and the reversing of the outer seal lip 130 to be outwardly projected is restrained to prevent the degrading of the appearance therearound.

A tip end part 134 of the door molding 54 is extended along an exterior surface of the outer side wall 126, and is bonded to the outer side wall 126 with a double-sided adhesive tape 136. A tip end of the tip end part 134 of the door molding 54 contacts a surface of the outer side wall reference plane 132 to hold the outer side wall reference plane 132 of the outer side wall 126.

The bottom wall 128 is formed into a plate shape, and a holding lip 138 is formed along an exterior tip end of the bottom wall 128 for engagement with a base part of the tip end part 134 of the door molding 54.

A bottom wall joint 140 is extended from a tip end of the bottom wall 128 toward the door glass 16 in a direction perpendicular to the bottom wall 128, and is connected to a tip end part 66 of the inner side wall 68. An engaging part 64 of the door molding 54 is inserted between the bottom wall joint 140 and the tip end part 66 of the inner side wall 68, and is engaged with a recess 98 formed in a surface of the tip end part 66 of the inner side wall 68, which faces the bottom wall joint 140.

Figure 7:
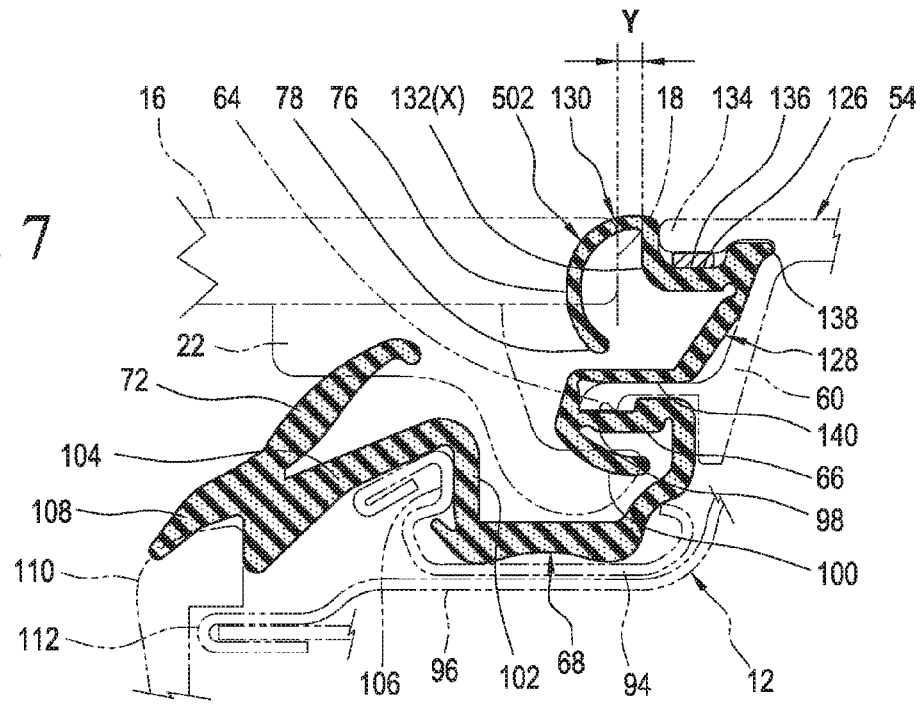
FIG. 7 is a cross-sectional view of a glass run in a third embodiment of the present invention, which is taken along line A-A of FIG. 1.

In the third embodiment, when the side edge 18 of the door glass 16 contacts the outer seal lip 130, the outer seal lip 130 does not contact the bottom wall 128, but, when the outer seal lip 130 is deformed to be bent with the side edge 18 of the door glass 16, the tip end part 78 of the outer seal lip 130 is located inwardly of a surface of the bottom wall 128, which faces the side edge 18 of the door glass 16 (downwardly in FIG. 7). As a result, the side edge 18 of the door glass 16 can securely contact the main part 76 of the outer seal lip 130, whereby the sealing properties between the side edge 18 of the door glass 16 and the main part 76 of the outer seal lip 130 can be improved.

Next, a fourth embodiment of the present invention will be explained with reference to FIG. 8. The fourth embodiment differs from the third embodiment in that no bottom wall is formed, and an outer side wall 142 is separated from an inner side wall 144, whereas remaining parts are substantially similar to those of the third embodiment, and accordingly, only different parts will be explained while omitting explanations of the similar parts.

The fourth embodiment is similar to the third embodiment in that the outer side wall 142 is formed into a plate-shape, an outer side wall reference plane 132 is formed so as to extend from a tip end of the outer side wall 142, and an outer seal lip 146 is formed from a tip end of the outer side wall reference plane 132 except that no bottom wall is formed. In addition, the configuration of the outer seal lip 146 is similar to that of the third embodiment.

A tip end part 134 of the door molding 54 is extended along an exterior surface of the outer side wall 142, and is bonded to the outer side wall 142 with a double-sided adhesive tape 136, similarly to the third embodiment. A holding lip 148 is formed along one tip end of the outer side wall 142 for engagement with a base part of the tip end part 134 of the door molding 54.

Figure 8:
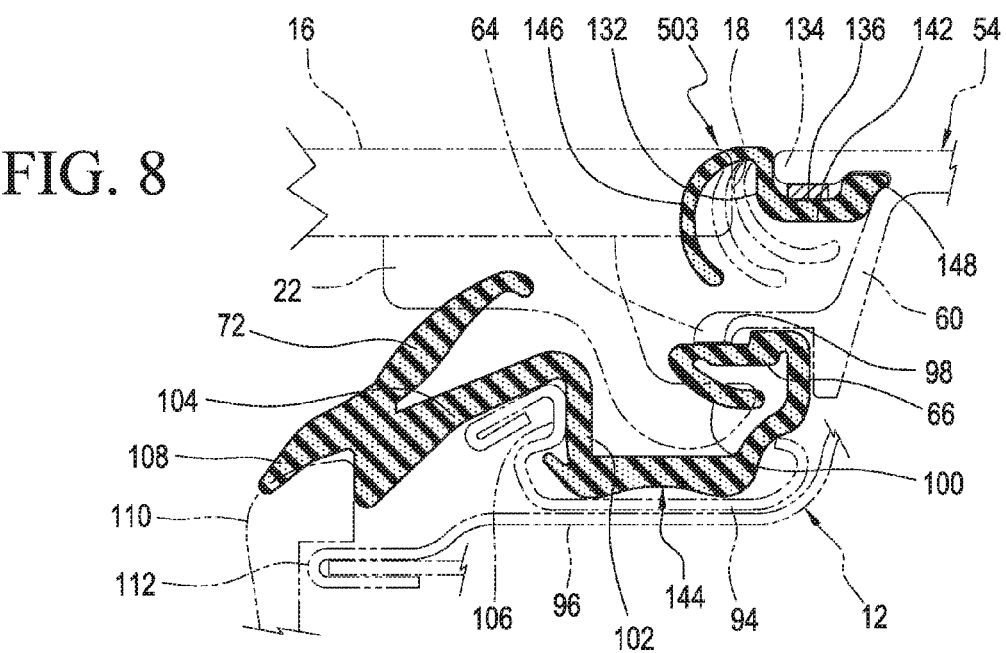
FIG. 8 is a cross-sectional view of a glass run in a fourth embodiment of the present invention, which is taken along line A-A of FIG. 1.

As shown in FIG. 8, neither bottom wall nor bottom wall joint is formed, and the outer side wall 142 is separated from the tip end part 66 of the inner side wall 144. The engaging part 64 of the door molding 54 is engaged with a recess 98 formed in a surface of the tip end part 66 of the inner side wall 144.

The straight parts 50a of the glass run 50, 501, 502, 503 are formed of a solid material, finely foaming material or a sponge material of a thermoplastic elastomer, and after extrusion, the above-described material is heated for vulcanization.

The corner parts 50*b* of the glass run 50, 501, 502, 503 are also formed of a thermoplastic elastomer. The materials of the straight parts 50*a* and the corner parts 50*b* are of the same kind as each other to improve adhesion between the straight parts 50*a* and the corner parts 50*b* of the glass run 50, 501, 502, 503. In addition, where an olefin-based material is used, it exhibits good weather resistance, and can be pulverized simultaneously, whereby easily recyclable glass runs can be obtained.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A glass run for an automobile, which is adapted to be attached to an inner periphery of a door frame of a door of an automobile for guiding a door glass as it is raised and lowered, the glass run for attachment to vertical sides of the door frame comprising:
    a bottom wall for attachment to one of the door frame and a door molding, and
    an outer seal lip extending from one of an exterior side edge of the bottom wall and a tip end of an outer side wall,
    the outer seal lip including a base part that extends towards the door glass, and a main part extending from the base part while curving inwardly therefrom such that when the outer seal lip is deformed and bent with a side edge of the door glass, a tip end part of the outer seal lip is located inwardly of a surface of one of the bottom wall and the outer side wall, which faces the side edge of the door glass,
    wherein the base part of the outer seal lip extends from one of the bottom wall and the outer side wall, the base part of the outer seal lip is located between a surface of the one of the bottom wall and the outer side wall and a portion of the base part that the side glass of the door glass most closely approaches when closing from an open position, and the base part has a rigidity lower than that of the main part, and
    wherein a low friction sliding layer is formed on a surface of the main part of the outer seal lip that contacts the door glass, and another low friction sliding layer is formed on the base part, the another low friction sliding layer having a thickness less than a thickness of the sliding layer formed on the surface of the main part.

2. The glass run as claimed in one of claim 1, wherein the main part of the outer seal lip is formed such that a curvature of the tip end part is smaller than that of the base part.

3. The glass run as claimed in one of claim 1, wherein the base part of the outer seal lip is formed to have a thickness less than that of the main part.

4. The glass run as claimed in one of claim 1, wherein the bottom wall for contacting the tip end part of the outer seal lip is formed to have an inclined surface.

5. The glass run as claimed in one of claim 1, wherein the glass run includes the outer seal lip, the bottom wall and an inner side wall which are integrally formed with each other, and an inner seal lip is extended from the inner side wall towards the outer seal lip.

6. The glass run as claimed in one of claim 1, wherein the glass run includes the outer seal lip, and one of the bottom wall and the outer side wall, which are integrally formed with each other, and the inner side wall and an inner seal lip extended from the inner side wall towards the outer seal lip are formed so as to be separated from the outer seal lip and one of the bottom wall and the outer side wall.

* * * * *